July 10, 1956

E. J. MARTIN ET AL 2,754,381

METAL BURETTE

Filed April 8, 1953

INVENTORS
Edward J. Martin &
BY Clark E. Quinn

Robert E. Fowler

July 10, 1956 E. J. MARTIN ET AL 2,754,381
METAL BURETTE

Filed April 8, 1953 2 Sheets-Sheet 2

INVENTORS
Edward J. Martin &
BY Clark E. Quinn
Robert E. Fowler

United States Patent Office 2,754,381
Patented July 10, 1956

2,754,381

METAL BURETTE

Edward J. Martin, Pleasant Ridge, and Clark E. Quinn, Detroit, Mich., assignors to General Motors Corporation, Detroit, Mich., a corporation of Delaware Application April 8, 1953, Serial No. 347,552

4 Claims. (Cl. 200—61.2)

This invention relates to measuring means and more particularly to means for measuring quantities of fluid such as fuel for internal combustion engine consumption testing.

Systems of various types have been devised for measuring quantities of fuel fed to an internal combustion engine and simultaneously reading engine output in some manner to obtain data on engine performance. Such a system is disclosed in co-pending application Serial No. 181,768, Martin et al., filed August 28, 1950, which issued as Patent No. 2,697,939, December 28, 1954, and assigned to a common assignee. In that system a measuring burette is disclosed of substantially spherical shape, known liquid capacity, and having inlet and outlet tubes. The liquid is forced out of the burette by displacing the fuel with a non-miscible liquid which in turn is electrically conductive to complete control and indicating circuits defining the limits of the measuring period. The earlier burettes, however, were formed of electrical insulating material such for example as glass, and were fragile and subject to breakage.

It is an object in making this invention to provide durable means for measuring fluid volumes;

It is a further object in making this invention to provide a measuring burette for fluids that is made of metal;

It is a still further object in making this invention to provide a metal measuring burette having a plurality of spaced electrical contacts to indicate the level of conductive liquids therein;

It is a still further object in making this invention to provide a metal measuring burette having a plurality of spaced electrical contacts which contact members may be removed easily for periodic cleaning and/or calibration.

It is a still further object in making this invention to provide a burette having a plurality of sizes of chambers so that different amounts of fluid may be measured;

It is a yet further object in making this invention to provide a metallic burette with a plurality of different sized chambers axially displaced and electrical contacts located intermediate the various chambers for indicating purposes.

With these and other objects in view which will become apparent as the specification proceeds, our invention will be best understood by reference to the following specification and claims and the illustrations in the accompanying drawings, in which:

Figure 1:
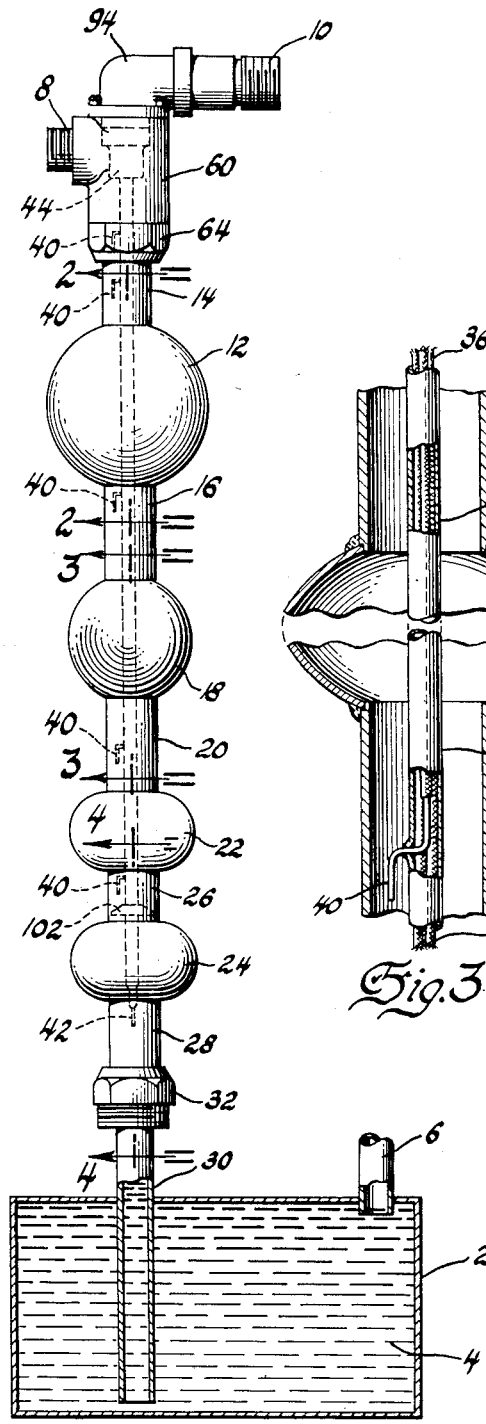
Figure 1 is a diagrammatic elevational view of a measuring means or burette incorporating our invention.
Figure 3:
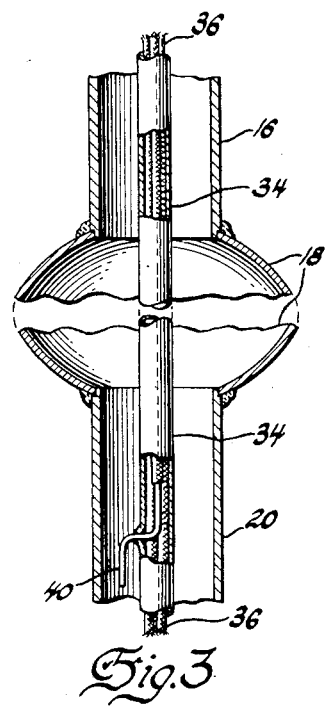
Figure 3 is a view similar to Figure 2 taken on line 3—3 of Figure 1.
Figure 2:
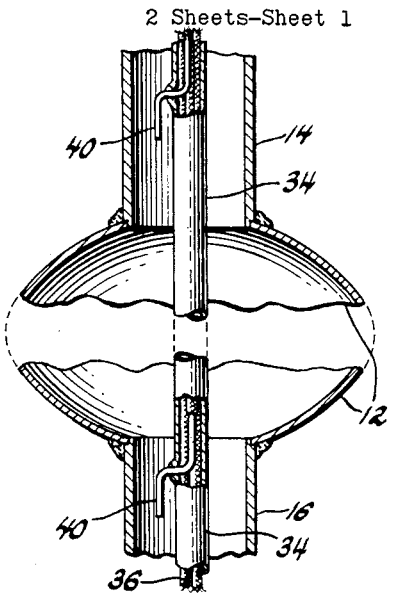
Figure 2 is an enlarged vertical sectional view taken on the line 2—2 of Figure 1.
Figure 4:
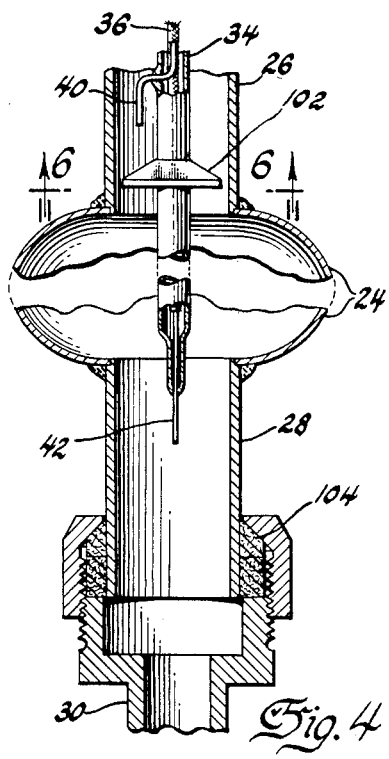
Figure 4 is a view similar to Figure 2 taken on line 4—4 of Figure 1.

Referring now more specifically to Figure 1, the burette assembly is shown as being placed in a vertical position with the lower end of the assembly extending into a tank 2 which is filled with an electrically conductive fluid 4 which is non-miscible with the fluid being measured, such for example as gasoline. An input line 6 is connected to the top of the tank 2 through which fluid is introduced into the tank 2 to force the fluid 4 up into the burette, displacing the quantities of fuel therein and closing desired contacts to indicate different amounts of fuel discharged. In general, the burette is formed of a series of enlarged sections connected by cylindrical tubes to form different internal volumes of the order of the amounts of fuel to be measured. The lower end of the assembly projects into the tank 2 and to the upper end of the assembly there are connected a fluid outlet 8 and an electrical coupling 10 for the desired indications.

The series of enlarged sections may be made in any desired manner, such for example as forming the enlarged spherical member 12 and providing it with circular openings on opposite sides to which short cylindrical tubes 14 and 16 are fixedly secured in any desired manner. To the opposite end of coupling tube 16 a smaller substantially cylindrical hollow member 18 is secured, and the lower part of that member is in like manner interconnected by a short tubular section 20 with a still smaller hollow member 22. The lower end of the burette consists of a fourth hollow member 24 connected to the member 22 by a short cylindrical tube 26, and having a further cylindrical connection 28 connected to its lower surface. Thus there is formed an elongated assembled member having a series of hollow enlarged sections coupled together by cylindrical tubes. The lowest tubular member 28 has coupled thereto an input pipe 30 through suitable coupling means 32. The pipe 30 extends down into the tank 2 and the non-miscible fluid may be forced up through this pipe upon the introduction of pressure or fluid to the inlet 6 of the tank.

In the present instance it is desired to utilize metal for the construction of the enlarged and tubular portions, in the interests of forming an assembly which will not be easily broken or distorted, and as an example, stainless steel has been found to be very satisfactory for this use, although various other metals could obviously be used. In this type of measuring system the burette is filled with liquid from the top through an opening such as 8 and the gasoline or other fuel completely fills the burette down to a predetermined level in tube 28 ready for testing. When the testing is started, pressure or liquid is introduced to the inlet 6 which forces the non-miscible fluid 4 into the pipe 30 and up into the burette. As it does so, of course, the fuel in the burete is forced out through the coupling 8 to the engine and is utilized.

Figures 5, 6:
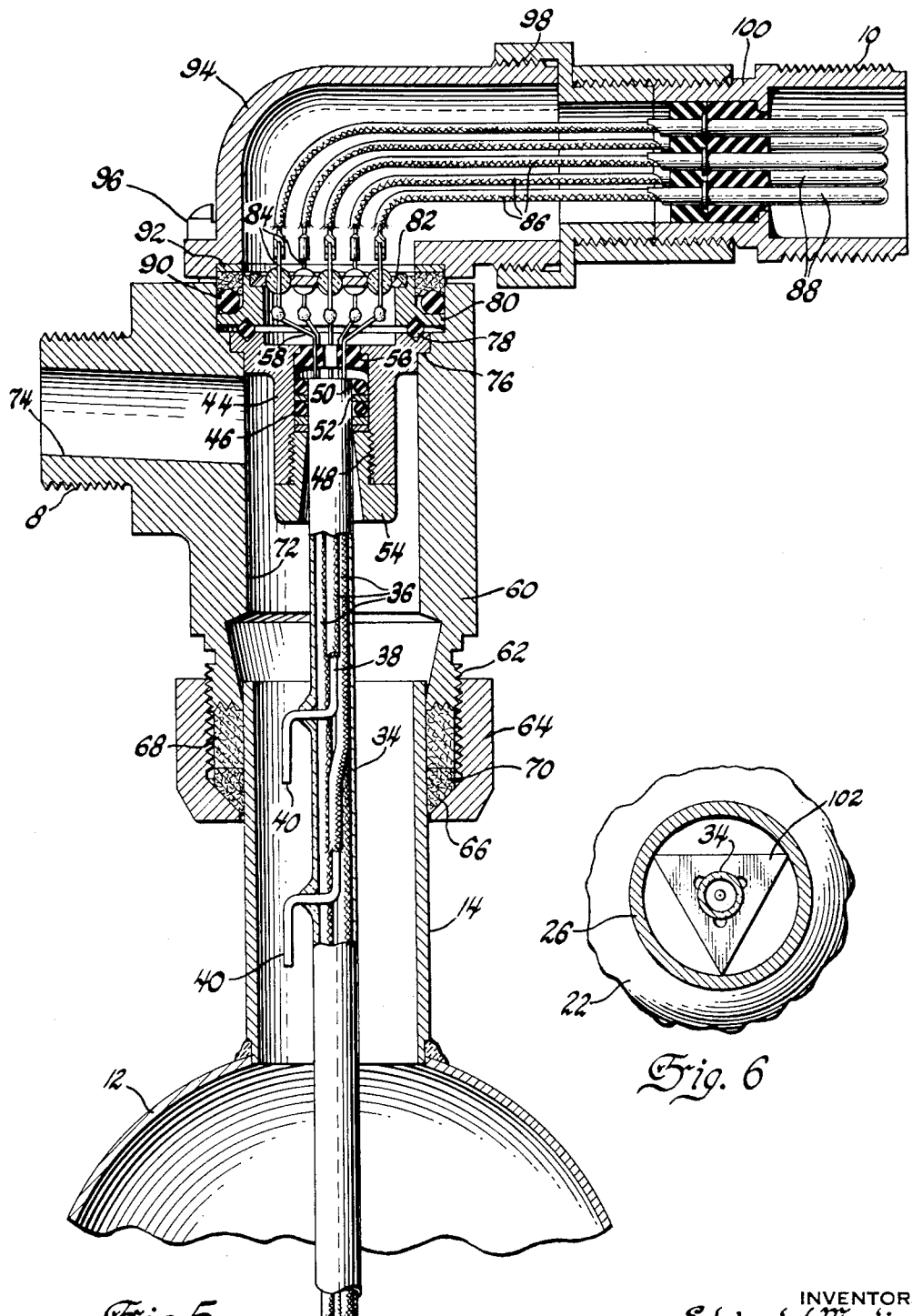
Figure 5 is an enlarged sectional view through the coupling at the top of the burette showing the electrical and fluid connections.
Figure 6 is a sectional view taken on line 6—6 of Figure 4.

It is desired, therefore, to accurately measure the amounts of fuel discharged from the burette, and this is accomplished by having a series of electrical contacts accurately located along the axial length of the burette so that electrical circuits are completed as the conductive fluid 4 reaches these contacts to provide indications in control and indicating circuits. The prior burettes in use were made of electrical insulating materials such as glass and in that case all that was necessary was to embed in the inlet or outlet tubes electrical contacts. However, since in this instance the burette is metallic, and therefore conductive, other means must be provided to support the electrical contacts at desired positions. In this case this is provided by an elongated rod of insulating material, for example glass, which extends down through the axial center of the whole assembly and is supported from the top. This glass rod carries at predetermined positions along its length platinum contacts which extend through the wall, and these contacts are connected to insulated conductors sealed within the glass tubing. There are, of course, as many conductors within the tubing as there are contacts which extend through the walls thereof, the number of conductors becoming less along the length of the tube. This is shown best in Figure 5, where there is shown the outside glass tube 34 within which a series of conductors 36 are housed.

When one conductor reaches the point at which it is to be coupled to a contact extending through the wall of the glass tube, it is soldered or otherwise fixedly connected thereto, as shown at 38, and then of course extends no further through the tube. The platinum contacts 40 thus extend out through sealed openings in the glass tube wall and assume the proper vertical locations in the tube when the assembly is mounted. From Figure 5 it will be obvious that the number of wires 36 decreases as the wires terminate in suitable contacts 40 until, when the lower end of the rod is reached, only one conductor remains which terminates in a contact 42 extending directly down from the bottom of the tube 34. It will be noted from Figure 1 that a contact 40 appears in each connecting tube 14, 16, 20, 26 and 28, so that an electrical circuit may be completed both below and above each of the measuring chambers 12, 18, 22 and 24.

The upper end of the tube or assembled rod 34 which carries the conductors is supported in a bushing 44 which has a central axial opening 46 therein, the lower half of which is threaded as at 48, a pair of deformable rings 50 separated by washers 52 surround the upper end of the insulating rod 34 and, when held in place by a gland nut 54 which is screw-threaded into the internally threaded section 48 of the bushing, clamp the upper end of the rod 34 in place. Mounted in the central opening in the bushing 44 above the end of the rod is an insulating disc 56 which supports the bared ends of the conductors 58 in spaced relation and through which disc these conductors are brought out for connection to suitable indicating and measuring means. The rod with the bushing assembled to its end is a complete subassembly.

After the spherical enlarged sections and tubular connectors of the burette have been fabricated and assembled as a unit, the upper end of the upper tubular section 14 has mounted thereon a coupling body 60. This coupling is generally cylindrical, the lower portion of which is externally screw-threaded as at 62 to accommodate a clamping collar 64 having an internally tapered surface 66 for clamping sealing bushings 68 and 70 against the end of the coupling 60 around the upper end of the tube 14. The coupling 60 has a central opening 72 therein which interconnects with a side channel 74 to which the engine input line may be coupled. The central opening 72 is notched at 76 adjacent its upper end to accommodate the supporting bushing 44 at the top of the insulating rod 34. When inserted in place, the bushing 44 seals the upper end of the opening 72 to divert fluid flow from channel 72 into 74. A deformable ring 78 is pressed against the upper face of the member 44 when in place by a supporting ring 80 which carries an insulating plate 82 having therein a series of terminals 84 projecting for a short distance on each side of the insulating plate 82. The lower ends of the terminals 84 are adapted to be secured to the ends of the conductors 58 upon assembly, and suitable connecting conductors 86 are adapted to snap over the projecting upper ends of the terminals 84 for connection to connecting prongs 88 of a coupling. The ring 80 is held in place in the upper end of the coupling 60 by suitable gaskets 90 and washers 92 which are pressed downwardly by the lower face of an elbow 94 secured to the top of coupling 60 by cap screws 96. The elbow may be threaded as at 98 and suitable prong coupling means 100 applied thereto so that disconnectable indicating means can easily be attached.

As the insulating rod 34 extends down through the burette and terminates at its lower end at axially projecting contact 42, suitable spacing member 102 is applied adjacent the lower end to space the rod from the sides of the tubes and also center it. This spacing means cannot, of course, be complete or no axial fluid flow could be obtained, and it may assume any suitable form permitting flow such, for example, as a triangle, as clearly shown in Figure 6. The input tube 30 is coupled to the lower end of the tube 28 by any suitable coupling means including gasket 104 to seal the connection.

In operation the burette is placed above a tank or storage vessel 2 containing non-miscible conductive fluid. The coupling 10 is electrically connected by suitable connector plugs to indicating means such as that shown in the co-pending application previously referred to, and coupling 8 is attached to the input to the carburetor of the internal combustion engine, and through the same connection to the main source of supply of fuel, the latter connection being controlled by a valve. Pipe 6 is connected to the gasoline pump or tank. Through the connections, just described, the burette is filled with gasoline down to approximately the lower end of tube 28 through coupling 8 and the valve connection to the source of fuel. When it is full, the valve between the coupling 8 and the source of fuel is closed and fuel pressure is then applied to tube 6. This forces the fluid 4 downwardly in tank 2 and upwardly in tube 30 to force the gasoline in the burette upwardly and out through coupling 8 to feed the internal combustion engine. Gasoline is nonconductive electrically, and therefore circuits connected to contact 42 and the series of contacts 40 are opened. As the conductive fluid 4, however, feeds up into the burette, electric circuits will be completed between contact 42 and the metal wall of the burette to complete indicating and control circuits and in sequence the various contacts 40 in the tubes 26, 20, 16 and 14. At the closure of each of these circuits the operator will know that the volumetric content of fuel in the enlarged containers 24, 22, 18 and 12 has been consumed, and when the last contact in tube 14 is closed, that all of the measured fuel has been utilized.

It is not, of course, necessary to consume the whole amount of fuel in the burette if only a short test is desired, and in that case when the circuit is closed between contact 42 and the non-miscible conducting fluid 4, the test is started and when the circuit is closed between contact 40 in tube 26, the operator will know that the measured amount of fuel content in the enlarged spherical section 24, which may be, for example, 75 cubic centimeters, has been consumed. It has been found that values of volume such as 75 cubic centimeters for sections 24 and 22, 150 cubic centimeters for section 18, and 300 cubic centimeters for section 12 form a good variety of sizes and together a sufficient volume to run adequate tests.

We claim:

1. In metering apparatus, an elongated hollow metallic body having spaced enlarged sections of known volume, hollow coupling means secured to one end providing for a continuous flow through the assembly, a long rigid member of electrical insulating material supported on said coupling and extending in spaced relation through said elongated member so that fluid may flow past, a plurality of electrical conductors within said long rigid member, a plurality of electrical contacts mounted in exposed spaced relation along the insulating member adjacent portions of smaller interior area in the hollow body, each connected to one of the electrical conductors.

2. In metering apparatus, an elongated metallic member, fabricated of alternate spherical and cylindrical sections providing a continuous chamber, the two end portions being cylindrical, coupling means secured to one end through which fluid may flow, a long rigid member of electrical insulating material supported on said coupling and extending in spaced relation through said elongated member so that fluid may flow past, a plurality of electrical conductors embedded therein, a plurality of contacts spaced longitudinally along the rigid member within the cylindrical sections, each contact being connected to one of the conductors, a plurality of electrical terminals insulatably carried in a supporting member, conductors connecting the terminals with the electrical conductors in the rigid member and means for securing the terminal mounting means on the coupling means.

3. In metering apparatus, an elongated metallic member, fabricated of alternate spherical and cylindrical sections providing a continuous chamber, the two end portions being cylindrical, coupling means connected to one end through which fluid may flow, a plurality of parallel electrical conductors of varying lengths bundled together, electrical insulating means encasing said conductors and having openings therein adjacent the end of each conductor through which said ends may project to form spaced electrical contacts, each of said contacts being spaced within one of the cylindrical sections, and means for supporting the insulating encased conductors at one end so that they extend through said elongated metallic member, so that fluid may flow past said contact and provide for indication of fluid level at the cylindrical sections.

4. In metering apparatus, an elongated hollow metallic body having alternate enlarged and restricted sections, said enlarged sections being of known volume, hollow coupling means secured to one end and providing for a continuous flow, a spaced contact assembly comprising a plurality of electrical conductors of difference lengths embedded in a glass coating, said conductors having end portions projecting through said glass coating to form contacts spaced along the length of the assembly and means for supporting said assembly at one end and extending in spaced relation through said elongated member so that fluid may flow past, said contacts being located within the restricted sections to indicate fluid level in the restricted sections.

References Cited in the file of this patent

UNITED STATES PATENTS

| | | |
|---|---|---|
| 1,425,908 | Schumaker | Aug. 15, 1922 |
| 1,504,978 | Robbins | Aug. 12, 1924 |
| 2,233,297 | Polin et al. | Feb. 25, 1941 |
| 2,325,695 | McAfee | Aug. 3, 1943 |
| 2,490,627 | Hofberg | Dec. 6, 1949 |
| 2,505,905 | McAfee | May 2, 1950 |